Oct. 15, 1935.  J. B. GLOWACKI  2,017,493
NUT
Filed Dec. 26, 1933
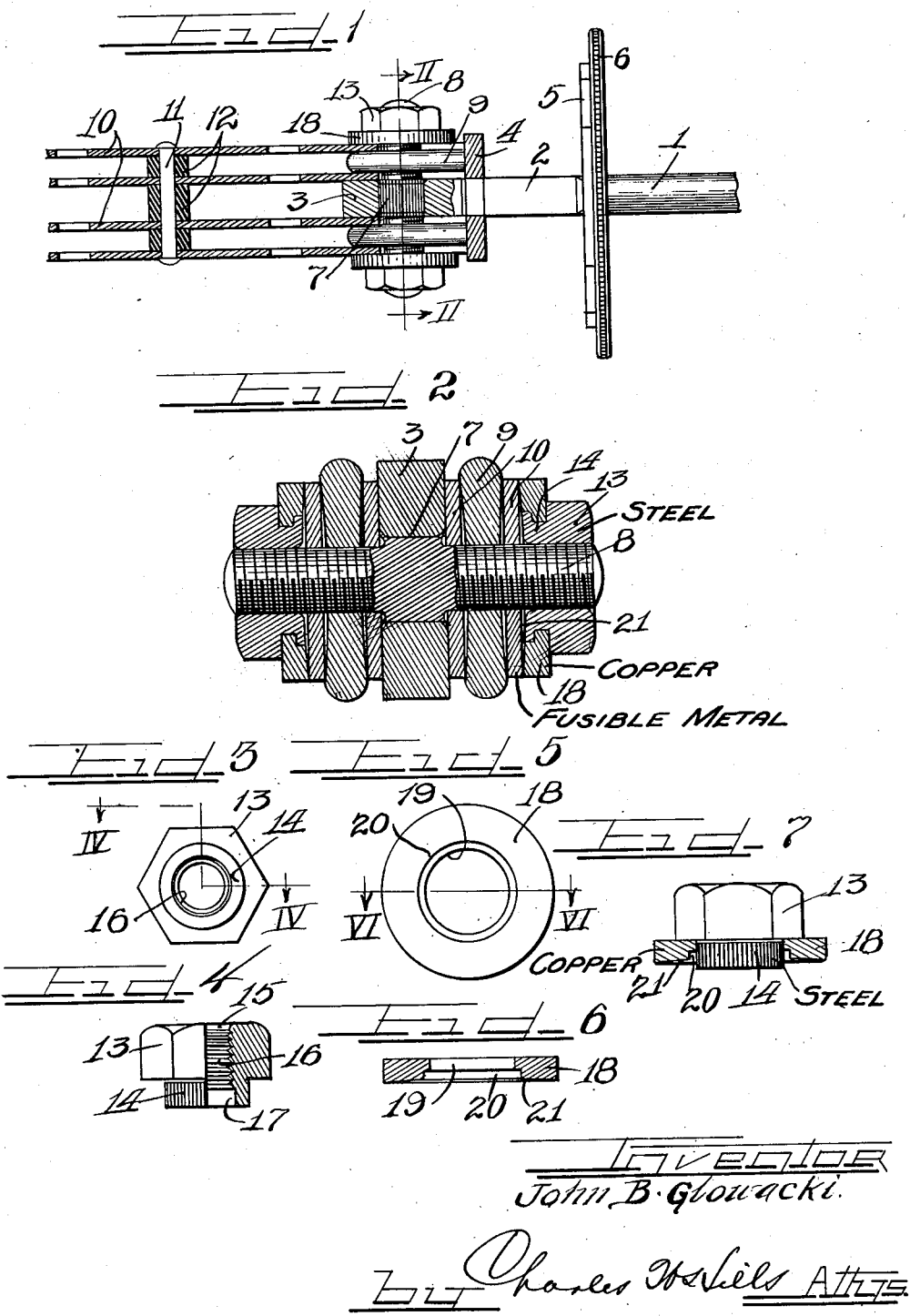
Inventor
John B. Glowacki.

Patented Oct. 15, 1935

2,017,493

UNITED STATES PATENT OFFICE 2,017,493

NUT

John B. Glowacki, Chicago, Ill.

Application December 26, 1933, Serial No. 703,879

4 Claims. (Cl. 173—324)

This invention is a continuation in part of my Patent No. 1,950,489, dated March 13, 1934, for a "Cartridge fuse knife blade type".

The present invention relates to an improved type of a nut constructed of a plurality of different kinds of metal of different conductivity and adapted for use in connection with fuses and other types of electrical equipment as well as for miscellaneous other purposes.

It is an object of this invention to provide an improved type of nut covering a combination nut and washer wherein the washer is constructed of a metal of greater conductivity than the metal out of which the nut member is constructed.

It is also an object of this invention to provide an improved type of nut having a washer or flange portion constructed of a metal softer than the metal out of which the main body of the nut is constructed and to which fused material resulting from the blowing of a fuse element is not apt to adhere.

It is a further object of this invention to provide an improved type of a nut unit including a ring or washer of a comparatively soft metal through which the knurled shank of a nut head of comparatively hard metal is adapted to be forced and upset to rigidly unite the washer and the nut head into a single unit.

It is furthermore an object of this invention to provide an improved and simplified type of nut unit constructed of brass and steel elements rigidly interfitting one another and held against rotation with respect to each other by means of a knurled portion on one of the members cut or forced through a portion of the other member.

It is an important object of this invention to provide an improved type of nut unit including a nut head constructed of a hard metal having a certain conductive quality, said nut having a portion thereof knurled or toothed and forced through a ring or washer of a softer metal having a greater conductivity than that possessed by the metal of which the nut head is constructed.

Other and further important objects of this invention will be apparent from the disclosures in the specification and the accompanying drawing.

The invention (in a preferred form) is illustrated in the drawing and hereinafter more fully described.

On the drawing:

Figure 1 is a fragmentary sectional view of one end of a cartridge fuse knife blade type terminal unit removed from its casing and including a double ended mounting screw or bolt having improved nut units embodying the principles of this invention engaged thereon for the purpose of holding a multiple type fuse element removably connected with the inner end of a terminal blade.

Figure 2 is an enlarged transverse detail section taken on line II—II of Figure 1 with the end portions of the screw or bolt member shown in elevation.

Figure 3 is a bottom plan view of the nut head member with the washer or flange ring removed.

Figure 4 is a sectional view of the nut head member taken on line IV—IV of Figure 3.

Figure 5 is a bottom plan view of the washer or flange ring member of the nut unit.

Figure 6 is a sectional view of the washer member taken on line VI—VI of Figure 5.

Figure 7 is a side assembly view of the nut head and washer member, with the washer member being illustrated in section and showing the knurled shank of the nut head before the projecting end of the knurled shank is upset.

As shown on the drawing:

For the purpose of illustrating one of the uses of the improved nut embodying the principles of this invention Figures 1 and 2 have been used to illustrate portions of a cartridge fuse of the knife blade type. The reference numeral 1 indicates a terminal blade of a fuse unit, said terminal blade having a reduced intermediate section 2 terminating in an inner section 3. A block or plate 4 is secured on the intermediate blade section 2 where it joins the inner end section 3. Mounted between the terminal blade sections 1 and 2 is a closure plate 5 and a lock member or ring 6.

Driven through an opening in the terminal blade section 3 is a knurled shank 7 of a double ended screw bolt having threaded sections 8. Loosely engaged on the bolt sections 8 are spacers 9 one end of each of which is squared to abut against the aligning lock 4 while the other end is curved and rounded to facilitate mounting of the forked tapered end sections of renewable fuse elements. This type of terminal mounting is provided for a high capacity fuse wherein a plurality of renewable fuse elements 10 are connected in a group by means of rivets 11 and insulating spacer sleeves 12.

Threaded on the outer end of each of the screw sections 8 is a combination nut and washer unit embodying the principles of this invention. The high capacity multiple type of fuse element is adapted to be mounted as a unit with the end section of the element engaged on the double ended bolt 8 with the squared ends of the elements abutting against the aligning block 4 whereby the multiple type renewable fuse unit is properly mounted in alignment with the terminal blade and is secured in said aligned position by means of the improved nut units.

Figures 3 to 7 inclusive illustrate the detailed construction of the improved nut of this invention. The nut unit comprises an angular nut head 13 of any desired shape constructed with a knurled shank 14 of reduced diameter on the inner end constructed of steel or other hard metal having a particular or selected conductivity. As clearly illustrated in Figure 4 the nut head 13 is countersunk at 15 and is internally threaded at 16 with said threaded portion extending within a short distance of the end of the knurled shank 14 leaving a plane interior surface or wall 17 in the outer end of the knurled section.

As illustrated in Figures 5 and 6 the washer or flange section of the nut unit comprises a flat ring 18 constructed of brass, copper or other suitable material having a greater thermal and electrical conductivity than that of the hard metal nut head 13 and the shank 14. The opening in the ring 18 consists of a small portion 19 and an enlarged portion 20, with the diameter of the reduced portion of the opening 19 being slightly less than the diameter of the knurled shank 14 of the nut member. In the assembly of the nut unit the knurled shank 14 of the nut head is driven downwardly through the reduced opening 19 of the washer or ring 18 and cuts into the material of the washer ring to rigidly hold the nut head and the washer ring secured against any possible rotational movement with respect to one another. As illustrated in Figure 7 the knurled shank projects through the washer after which the projecting portion of the shank 14 is upset and is forced to fill the excess portion of the opening 20 so that in the finished product of the nut unit the exposed end of the upset shank 14 is concave and flush with the outer concave surface of the washer or flange 18.

As clearly illustrated in Figure 2 it will be noted that the bottom surface of the nut unit is formed slightly concave at 21 whereby a tighter grip may be obtained by the nut unit when the same is threaded onto a screw bolt against a fuse element or other member which is to be secured in position.

The completed nut unit comprises the combination nut head and washer and is constructed of two kinds of metal with the metal of the nut head being of low conductivity while the metal of which the washer flange is constructed is of comparatively high conductivity.

When the improved multiple metal nut units are used in connection with fuses as illustrated in Figures 1 and 2 of the drawing, use of separate soft metal washers is eliminated by the use of the soft metal flanges or washers 18 of the nut units.

It will of course be understood that many changes may be made and numerous details of construction may be varied through a wide range without departing from the principles of this invention and it is therefore not the purpose to limit the patent granted hereon otherwise than necessitated by the scope of the appended claims.

I claim as my invention:

1. A nut having a flange and presenting therewith a base clamping face with a central portion of hard metal bounded by a peripheral portion of a metal softer and thermally and electrically more conductive than the central portion, the central portion having a threaded bore.

2. A nut having a flange and presenting therewith a base concave clamping face with a central portion of hard metal bounded by a peripheral portion of a metal softer and thermally and electrically more conductive than the central portion, the central portion having a threaded bore.

3. A nut of hard metal having a serrated reduced portion and a shoulder, a washer of relatively soft metal of high thermal and electrical conductivity forced on said reduced portion and against said shoulder, said washer having a greater diameter than said nut whereby a portion thereof extends outwardly of said nut to define an outstanding flange for the nut, the assembly presenting a clamping face with a central portion of hard metal bounded by a peripheral portion of softer and more conductive metal, the central portion having a threaded bore.

4. In a fuse having a plurality of fusible plates, means to clamp said fusible plates, said means comprising a nut having a body of hard metal and having an outwardly extending flange adapted to engage a fusible plate and presenting a concaved clamping face with a central portion of hard metal bounded by a peripheral portion of softer and thermally and electrically more conductive metal, a shoulder formed on said body and overlying a portion of said softer metal, said central portion having a threaded bore.

JOHN B. GLOWACKI.